United States Patent [19]
Mueller

[11] Patent Number: 5,268,345
[45] Date of Patent: Dec. 7, 1993

[54] REACTIVATION OF MONTMORILLONITE CATALYSTS

[75] Inventor: Herbert Mueller, Frankenthal, Fed. Rep. of Germany

[73] Assignee: BASF Aktiengesellschaft, Ludwigshafen, Fed. Rep. of Germany

[21] Appl. No.: 953,626

[22] Filed: Sep. 30, 1992

[30] Foreign Application Priority Data

Oct. 4, 1991 [DE] Fed. Rep. of Germany ....... 4132895

[51] Int. Cl.$^5$ .......................... B01J 38/02; B01J 38/04
[52] U.S. Cl. ........................................ 502/56; 502/34; 502/38
[58] Field of Search .............................. 502/34, 38, 56

[56] References Cited

U.S. PATENT DOCUMENTS

| | | | |
|---|---|---|---|
| 2,631,123 | 3/1953 | Kaulakis | 196/52 |
| 2,765,282 | 10/1956 | Elliott | 252/418 |
| 4,235,751 | 11/1980 | Del Pesco | 252/450 |
| 4,243,799 | 1/1981 | Mueller et al. | 528/409 |
| 4,363,924 | 12/1982 | Mueller et al. | 549/509 |
| 4,471,063 | 9/1984 | Hettinger | 502/39 |

FOREIGN PATENT DOCUMENTS

1219598  3/1987  Canada .

*Primary Examiner*—W. J. Shine
*Attorney, Agent, or Firm*—Keil & Weinkauf

[57] ABSTRACT

A process for the reactivation of spent montmorillonite catalysts by thermal treatment, in which the spent catalysts are heated at a temperature of from 650° to 850° over a period of from 0.2 to 3 hours, and the montmorillonite catalysts thus obtained.

2 Claims, No Drawings

REACTIVATION OF MONTMORILLONITE CATALYSTS

The present invention relates to a process for the reactivation of montmorillonite catalysts by thermal treatment and to the montmorillonite catalysts thus obtained.

Montmorillonites are a natural type of clay having, ideally, the formula $Al_2O_3.SiO_2.HOH+nH_2O$ (water of crystallization). When pretreated with strong acids, the mineral may be used, for example, as a bleaching clay or as a catalyst for reactions which are otherwise catalyzed by protonic acids such as sulfuric acid, hydrochloric acid, phosphoric acid, or perchloric acid, or with Lewis acids such as metal halides, e.g., halides of iron, zinc, tin, and aluminum. Examples of such reactions are the polymerization of tetrahydrofuran (THF) to polytetrahydrofuran (PTHF) (cf U.S. Pat. No. 4,243,799) or the copolymerization of THF with alkylene oxides to form poly(tetrahydrofuran-co-alkylene oxide)s, the depolymerisation of PTHF (cf EP-A 52,213), or the esterification of carboxylic acids with alcohols, for example for the synthesis of solvents. Before they are used as catalysts, the natural montmorillonites are pretreated and activated, for example by the methods disclosed in *Ullmanns Encyklopadie der technischen Chemie*, 3rd Edition, Vol. 4, pp 541-545, Urban and Schwarzenbeck, Munich 1953 and U.S. Pat. No. 4,235,751.

Montmorillonites, often referred to as bleaching clays on account of their bleaching action, are generally used industrially in two types of processes. In the percolation process, the reactants are caused to pass through a fixed bed containing the montmorillonite catalysts, whereas in the suspension process the catalyst is suspended in the reaction mixture and then removed therefrom on completion of the reaction, usually by mechanical means such as centrifugation or filtration.

Regardless of the type of process in which they are employed and the purpose thereof, these bleaching clay catalysts have only limited lifetimes, that is to say, their catalytic activity and selectivity diminish with time to such an extent that they must be replaced by fresh charges of catalyst both for economical reasons and for product-specific reasons, particularly as regards the purity of the products formed. There are therefore economical advantages to be gained from the reactivation of such deactivated montmorillonite catalysts.

The deactivation of said montmorillonite catalysts is probably caused by the adsorption of organic substances from the reaction mixture, which block the catalytically active sites of the montmorillonites or modify, by their presence, the specific activity of said sites. Reactivation of the montmorillonites might be effected, therefore, by destroying or extracting such catalyst poisons. For this reason attempts have been constantly made to reactivate bleaching clay catalysts by burning off the absorbed catalyst poisons. This burning method, however, has always led to high losses of bleaching power and catalyst activity of the montmorillonite catalysts thus treated.

A paper by Schultze (*Angew. Chem.* 49, 74 (1936)) describing systematic research shows that the activity of bleaching clays can deteriorate at temperatures as low as the "inversion" temperature of from 120° to 150° C. When bleaching clays are roasted, their crystalline structure and thus their catalytic activity is lost as soon as a temperature of from 300° to 400° C. is reached (cf Ullmann, 3rd Edition, Vol. 4, bottom of page 544). It has thus seemed to be impossible to completely remove the adsorbed materials by combustion methods. Since the best of the reactivating processes operating on this principle have achieved recoveries of catalyst activity of only 50% to not more than 75%, this type of regeneration has assumed no industrial significance.

U.S. Pat. No. 4,235,751 also makes reference to the thermal instability of activated bleaching clays. This patent discloses a process for the preparation of montmorillonite catalysts from raw montmorillonites by a special solvent treatment and activation with an organic acid. Following activation with said acid, the montmorillonite catalyst should, according to said patent, be dried at temperatures not exceeding 150° C. to avoid loss of activity.

Thus, no process has as yet been proposed which constitutes an economical way of almost completely restoring the catalytic activity and selectivity of deactivated montmorillonite catalysts. It is an object of the present invention to provide such a process.

Accordingly, we have found a process for the reactivation of a spent montmorillonite catalyst by thermal treatment, wherein the spent catalyst is heated at a temperature of from 650° to 850° C. for a period of from 0.2 to 3 hours.

The present invention also relates to a montmorillonite catalyst which, after it has been used to catalyze the polymerization of tetrahydrofuran to polytetrahydrofuran or the copolymerization of tetrahydrofuran with alkylene oxides or the depolymerization of polytetrahydrofuran or poly(tetrahydrofuran-co-alkylene oxide)s, has been subjected to thermal treatment at a temperature of from 720° to 820° C. over a period of from 0.5 to 2 hours.

According to the present invention, the montmorillonite catalysts to be reactivated are subjected to thermal treatment at from 650° to 850° C. and preferably from 700° to 820° C. and more preferably from 720° to 820° C. over a period of from 0.2 to 3 hours and preferably from 0.5 to 2 hours. This thermal treatment can be carried out in the presence of air or under a blanket of inert gas such as argon. The thermal reactivation of the montmorillonites may be carried out batchwise, for example in shelf-type kilns, or continuously, for example in rotary kilns. The type of kiln used has usually no crucial effect on the success of the process of the invention. It is usually unnecessary to subject the thermally regenerated montmorillonite catalysts to renewed activation with an acid.

The material which can be subjected to the reactivating procedure proposed by the invention is virtually any montmorillonite showing diminished activity as bleaching clay or as catalyst for, e.g., the polymerization or depolymerization of THF and PTHF respectively, examples being the montmorillonite catalysts described in U.S. Pat. Nos. 4,243,799, 4,235,751, and *Ullmans Encylkopadle der technischen Chemie*, 3rd Edition, Vol. 4, pp 541 to 545, Urban und Schwarzenberg, Munich 1953. The time at which such reactivation should be carried out depends on the process in which the montmorillonite catalyst or bleaching clay is used and is usually governed by economic aspects such as a decrease in space-time yield or diminution of product quality. The process of the invention achieves particularly good results when it is applied to the regeneration of montmorillonite catalysts such as have been used to catalyze the polymerization of THF to PTHF or the copolymerization of THF with alkylene oxides, especially $C_2$-$C_4$ alkylene oxides, to form poly(tetrahydrofuran-co-alkylene oxide)s or the depolymerization of PTHF or poly(tetrahydrofuran-co-alkylene oxide)s.

The process of the invention can be used for the reactivation of deactivated montmorillonite catalysts any desired number of times, which avoids the costs otherwise necessarily incurred by environmentally acceptable disposal and dumping of the spent catalysts.

A surprising result of reactivation carried out with the process of the invention is that not only are the original activity and selectivity of the catalyst fully restored, but also catalysts which have been reactivated by the process of the invention are superior to the fresh catalysts originally used as regards activity and selectivity by a factor of up to about 1.3.

A step-up of activity and selectivity can be observed on montmorillonite catalysts which have been reactivated by the process of the invention and which are employed in the polymerization of THF to PTHF, the copolymerization of THF with alkylene oxides, the depolymerization of PTHF, and the esterification of carboxylic acids with alcohols.

In the polymerization of THF, measurements show an increase in the activity of the regenerated catalyst over that of the original catalyst when the latter is used for the first time. Moreover, the polytetrahydrofuran obtained when using the regenerated catalyst has a very narrow molecular weight distribution $\overline{M}_w/\overline{M}_n$ of 1.3, which shows that the selectivity of the regenerated catalyst is clearly better than that of the original catalyst. The polytetrahydrofurans obtained using the reactivated montmorillonite catalysts have a color number which is so low that there is no need to subject the tetrahydrofuran used for the polymerization to pretreatment such as is described in EP-A 61,668 and U.S. Pat. No. 4,243,799.

When montmorillonite catalysts which have been regenerated by the process of the invention are used in the copolymerization of THF with ethylene oxide, the formation of undesirable cyclic, oligomeric ethers is significantly reduced, and when said montmorillonite catalysts are employed to catalyze the esterification of carboxylic acids with alcohols, there is not only an increase in the reaction rate but also a decrease in the formation of olefins from the alcohols.

These favorable characteristics of the reactivated montmorillonites are most marked when a reactivated montmorillonite is used which has been subjected to thermal treatment at a temperature of from 700° to 820° C. and preferably from 720° to 820° C. over a period of from 0.5 to 2 hours and which was used, prior to such reactivation, to catalyze the polymerization of THF to PTHF, the copolymerization of THF with alkylene oxides, particularly $C_2$-$C_4$ alkylene oxides, or the depolymerization of polytetrahydrofuran or poly(tetrahydrofuran-co-alkylene oxide)s.

It is interesting to note that the aforementioned step-up in activity and selectivity is only observed on spent montmorillonites which have been reactivated by the process of the invention, but not on fresh commercial montmorillonite catalysts which have been subjected to such thermal treatment. When the thermal treatment of the invention is applied to unused montmorillonite catalysts, there is at most only a slight improvement in their properties, but usually there is a loss of activity, as is to be expected from the teaching of the literature cited above.

Using montmorillonite catalysts which have been reactivated by the process of the invention conventional methods known in the art can be adopted for the polymerization of THF to PTHF (U.S. Pat. No. 4,243,799, EP-A 61,668), the copolymerization of THF with alkylene oxides (EP-A 104,609), the depolymerization of PTHF (EP-A 52,213), and the esterification of carboxylic acids with alcohols (DE-A 1,211,643).

EXAMPLES

The molecular weight distribution is defined as the quotient of the weight-average molecular weight $\overline{M}_w$ divided by the number-average molecular weight $\overline{M}_n$ ($\overline{M}_w/\overline{M}_n$). The molecular weights of the THF polymers obtained were determined by gel-permeation chromatography. The number-average molecular weight $\overline{M}_n$ was calculated from the chromatograms using the equation:

$$\overline{M}_n = \frac{\Sigma c_i}{\Sigma c_i/M_i}$$

in which $c_i$ stands for the concentration of the individual polymer species i in the polymer mixture formed and $M_i$ denotes the molecular weight of the individual polymer species i.

The weight-average molecular weight $\overline{M}_w$ was calculated from the chromatograms using the equation $$\overline{M}_w = \frac{c_i M_i}{\Sigma c_i}$$

The catalysts used in the various experiments were as follows:

CATALYST 0

Montmorillonite catalyst K 306 as sold by Süd-Chemie, Munich and dried to constant weight at 150° C. before use.

CATALYST 1

Catalyst 0 which, after having been dried at 150° C., was treated in a rotary kiln for 1 hour at 750° C.

CATALYST 2

Catalyst 0 which had previously been used over a period of 4 years to catalyze the continuous polymerization of THF in the presence of acetic anhydride and whose activity at the end of this period was only 60% of that of the original catalyst. This catalyst was washed with water and methanol and then dried to constant weight at 150° C.

CATALYST 3 (INVENTION)

The dried catalyst 2 was also heated in air in a rotary kiln for 2 hours at 750° C.

CATALYST 4

The dried catalyst 2 was also heated in a rotary kiln for 2 hours at 550° C.

CATALYST 5

The dried catalyst 2 was also heated in a rotary kiln for 2 hours at 850° C.

EXAMPLE 1

Polymerization of THF

A mixture of 91% w/w of THF and 9% w/w of acetic anhydride was placed in circulating equipment and caused to trickle through a fixed bed comprising 250 ml of the montmorillonite catalyst at 50° C. under a blanket of argon to effect polymerization of said mixture. The rate of circulation of the reaction mixture was such that the average time of contact between any one unit of volume of the reaction mixture and the catalyst was approximately 3 hours for a total reaction time of 8 hours. The reaction mixture was then discharged and analyzed. The results of the reaction are listed in Table 1 below.

The degree of conversion was calculated by determining the amount of acetic anhydride converted. This was done by determining the concentration of unconverted acetic anhydride by gas chromatography. The concentration of PTHF in the reaction mixture was determined gravimetrically after the removal of the volatile constituents of the reaction mixture. The color number APHA was determined as specified in DIN-/ISO 6271.

TABLE 1

| | Polymerization of THF | | | |
|---|---|---|---|---|
| Catalyst No. | Content of PTHF in product mixture [% w/w] | Converted acetic anhydride [% molar]* | Color Number APHA | $\overline{M}_w/\overline{M}_n$ |
| 0 | 50 | 85 | 30 | 1.6 |
| 1 | 55 | 87 | 30 | 1.4 |
| 2 | 38 | 60 | 60 | 1.9 |
| 3 | 59 | 99 | 5 | 1.3 |
| 4 | 55 | 94 | 10 | 1.4 |
| 5 | 54 | 92 | 15 | 1.5 |

*100% molar would denote complete conversion after a contact time of 3 hours.

Taking the acetic anhydride conversion in % molar as a measure of catalyst activity, Catalyst 3 is approximately 1.2 times more active than Catalyst 0.

EXAMPLE 2

Esterification of carboxylic acids

A mixture of acetic acid and n-butanol in a molar ratio of 1:1 was placed in the circulating equipment used in Example 1 and reacted therein at 85° C., this temperature being chosen to ensure that a state of esterification equilibrium was not reached during the said average contact time between reaction mixture and catalyst of 3 hours. The catalyst activity was characterized by determination the degree of conversion, defined as the amount of water formed during the esterification for a given temperature and reaction time. This water of reaction was determined by the Karl-Fischer method. The results of the esterification experiments are listed in Table 2 below.

TABLE 2

| | Esterification of acetic acid with n-butanol | | | | | |
|---|---|---|---|---|---|---|
| Catalyst No. | 0 | 1 | 2 | 3 | 4 | 6 |
| Content of $H_2O$ in mixture [% w/w] | 2.9 | 3.0 | 1.9 | 4.1 | 3.2 | 2.9 |

EXAMPLE 3

Depolymerization of PTHF

PTHF having an average mw of 1000 was mixed with 10% w/w of catalyst and heated at 140° C. for one hour with the exclusion of air. The amount of THF eliminated was determined gravimetrically after isolation of the THF by evaporation. The results are listed in Table 3 below.

TABLE 3

| Catalyst No. | 0 | 1 | 2 | 3 | 4 | 5 |
|---|---|---|---|---|---|---|
| Eliminated THF [% w/w] | 15 | 13 | 5 | 35 | 29 | 28 |

We claim:

1. A process for the reactivation of a spent montmorillonite catalyst which has been previously used to catalyze the polymerization of tetrahydrofuran to polytetrahydrofuran, the copolymerization of tetrahydrofuran with alkylene oxides, or the depolymerization of polytetrahydrofuran or poly(tetrahydrofuran-co-alkylene oxide)s by thermal treatment, wherein the spent catalyst is heated at a temperature of from 650° C. to 850° C. for a period of from 0.2 to 3 hours.

2. A montmorillonite catalyst, obtained by subjection thereof to thermal treatment at a temperature of from 700° to 820° C. over a period of from 0.5 to 2 hours.

* * * * *